United States Patent
Lightstone et al.

(10) Patent No.: US 11,234,143 B2
(45) Date of Patent: Jan. 25, 2022

(54) CUSTOMIZATION APPROACH FOR COOPERATING NODES

(71) Applicant: Telefonaktiebolaget LM Ericsson (publ), Stockholm (SE)

(72) Inventors: Leonard Lightstone, Ottawa (CA); Alex Stephenne, Stittsville (CA); Dongsheng Yu, Ottawa (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 223 days.

(21) Appl. No.: 16/069,074

(22) PCT Filed: Jun. 23, 2016

(86) PCT No.: PCT/IB2016/053748
§ 371 (c)(1),
(2) Date: Jul. 10, 2018

(87) PCT Pub. No.: WO2017/122057
PCT Pub. Date: Jul. 20, 2017

(65) Prior Publication Data
US 2019/0028912 A1 Jan. 24, 2019

Related U.S. Application Data

(60) Provisional application No. 62/278,714, filed on Jan. 14, 2016.

(51) Int. Cl.
H04W 24/08 (2009.01)
H04W 28/18 (2009.01)
H04W 92/20 (2009.01)

(52) U.S. Cl.
CPC .......... *H04W 24/08* (2013.01); *H04W 28/18* (2013.01); *H04W 92/20* (2013.01)

(58) Field of Classification Search
None
See application file for complete search history.

(56) References Cited

U.S. PATENT DOCUMENTS

2005/0111403 A1* 5/2005 Rudolf ............... H04L 41/0213
370/328
2006/0160533 A1 7/2006 Chou et al.
(Continued)

FOREIGN PATENT DOCUMENTS

EP 2 763 496 A1 8/2014

OTHER PUBLICATIONS

International Search Report and Written Opinion dated Dec. 19, 2016 issued by the International Searching Authority in corresponding PCT Application No. PCT/IB2016/053748, consisting of 12 pages.
(Continued)

*Primary Examiner* — Christine T Duong
(74) *Attorney, Agent, or Firm* — Christopher & Weisberg, P.A.

(57) ABSTRACT

A method and network entity for differentiated handling of at least one interaction of network nodes within a communication network. The method includes obtaining, at a first network node, information about a category of at least one second network node related to an interaction type, a communication channel having been established between the first network node and the at least one second network node, and selecting a communication algorithm based on the obtained information to provide the differentiated handling of the at least one interaction of network nodes within the communication network.

20 Claims, 11 Drawing Sheets

(56) References Cited

U.S. PATENT DOCUMENTS

| | | | | |
|---|---|---|---|---|
| 2007/0298775 | A1* | 12/2007 | Patzer | H04M 3/2263 455/419 |
| 2010/0240312 | A1* | 9/2010 | Peng | H04W 72/02 455/63.1 |
| 2015/0341939 | A1* | 11/2015 | Sharma | H04W 72/08 370/329 |
| 2015/0350737 | A1* | 12/2015 | Anderson | H04N 21/47205 348/564 |
| 2016/0013984 | A1* | 1/2016 | Sun | H04L 41/0866 370/252 |

OTHER PUBLICATIONS

3GPP TS 123.003 Version 10.5.0 Release 10; Global System for Mobile Communications, Apr. 2012, Digital Cellular Telecommunications System (Phase 2+); Universal Mobile Telecommunications System (UMTS); Numbering, Addressing and Identification, consisting of 83 pages.

Mexican Office Action and English translation dated Apr. 22, 2021 issued in Mexican Patent Application No. MX/a/2018/008538, consisting of 4 pages.

* cited by examiner

CUSTOMIZATION APPROACH FOR COOPERATING NODES

CROSS-REFERENCE TO RELATED APPLICATIONS

This application is a Submission Under 35 U.S.C. § 371 for U.S. National Stage Patent Application of International Application Number: PCT/IB2016/053748, filed Jun. 23, 2016 entitled "CUSTOMIZATION APPROACH FOR COOPERATING NODES" which claims priority to U.S. Provisional Application Ser. No. 62/278,714, filed Jan. 14, 2016, the entirety of both of which are incorporated herein by reference.

TECHNICAL FIELD

The present disclosure relates to communication systems, and in particular to methods and network entities for differentiated handling of interactions between network nodes.

BACKGROUND

Technology is generally moving towards a global set of standards for inter-device communication. Such a consolidation is seen as a boon to both consumers and suppliers. For example, in the previous two decades (1990-2010) of cellular wireless development, various countries and different operators would support different standards, making interoperability often impossible, and thereby impacting consumer flexibility and supplier economy of scale.

Furthermore, with the internet of things (IoT), the nature of the inter-device communication is increasing in scope. For example, 5G technologies now need to contend with such extremes as:

Very low bandwidth, long latency communication vs. very high bandwidth tight latency communication;
  Fixed devices vs. highly mobile devices;
  Simple low cost devices vs. complex high cost devices;
  Peer-to-peer communication vs. hierarchically organized communication;
  Multiple interacting nodes. This includes situations where a third node "facilitates" the setup of communications between two peer nodes as well as, mesh networks, cooperating multi-point receivers or transmitters, and relays; and
  Use of licensed vs. unlicensed spectrum vs. use of both.

Despite the benefits brought by a global set of standards-based approaches, such approaches do face the drawback that, by definition, a world-wide standard is a compromise solution based on agreement between parties with different plans and different views on technology. Furthermore, a standards-based process can be a slow and cumbersome one that does not readily admit the rapid introduction of new approaches regardless how advantageous such technologies may appear to be.

One of the differentiators for customers (whether operators, individual consumers, or component integrators) is the performance of a system. In open standards solutions the performance of a system is generally dependent on the components and algorithms that comprise the solution.

SUMMARY

Some embodiments of the present disclosure advantageously provide a method and system for differentiated handling of at least one interaction of network nodes within a communication network. According to one aspect, the method includes obtaining, at a first network node, information about a category of at least one second network node related to an interaction type, a communication channel having been established between the first network node and the at least one second network node. The method also includes selecting a communication algorithm based on the obtained information to provide the differentiated handling of the at least one interaction of network nodes within the communication network.

According to this aspect, in some embodiments, the method further includes implementing the communication algorithm. In some embodiments, the communication algorithm is a measurement algorithm. In some embodiments, the information about the category of the at least one second network node is obtained via signaling between the first node and the at least one second network node. In some embodiments, the method further includes handshaking with the at least one second network node regarding the selection of the communication algorithm. In some embodiments, the information about the category of at least one second network node is obtained from a container repository located at a third network node. In some embodiments, the information about the category of the at least one second network node is obtained from a container repository provided in a memory at the first network node.

In some embodiments, the method further includes determining a first category for the first network node, determining a second category for the at least one second network node based on the obtained information, creating a pairing entry in a container repository, the pairing entry including a pairing of the first category for the first network node with the second category for the at least one second network node, and identifying the communication algorithm based at least on the pairing entry. In some embodiments, the interaction type is a differentiated link establishment between the first network node and at least one of the at least one second network node. In some embodiments, the interaction type is providing link quality information. In some embodiments, the category is a type of the at least one network node. In some embodiments, the category is a user identity of the at least one second network node.

According to another aspect, in some embodiments, the memory further stores instructions that, when executed, configure the processor to implement the communication algorithm. In some embodiments, the communication algorithm is a measurement algorithm. In some embodiments, the information about the category of the at least one second network node is obtained via signaling between the network entity and the at least one second network node. In some embodiments, the processor is further configured to handshake with the at least one second network node regarding the selection of the communication algorithm. In some embodiments, the information about the category of the at least one second network node is obtained from a container repository located at a third network node. In some embodiments, the information about the category of the at least one second network node is obtained from a container repository provided in the memory.

In some embodiments, the memory further stores instructions that, when executed, configure the processor to determine a first category for the first network node, determine a second category for the at least one second network node based on the obtained information, create a pairing entry in a container repository, the pairing entry including a pairing of the first category for the first network node with the second category for the at least one second network node, and identify the communication algorithm based at least on the pairing entry. In some embodiments, the interaction type is a differentiated link establishment between the network entity and at least one of the at least one second network node. In some embodiments, the interaction type is providing link quality information. In some embodiments, the category is a type of the at least one second network node. In some embodiments, the category is a user identity of the at least one second network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
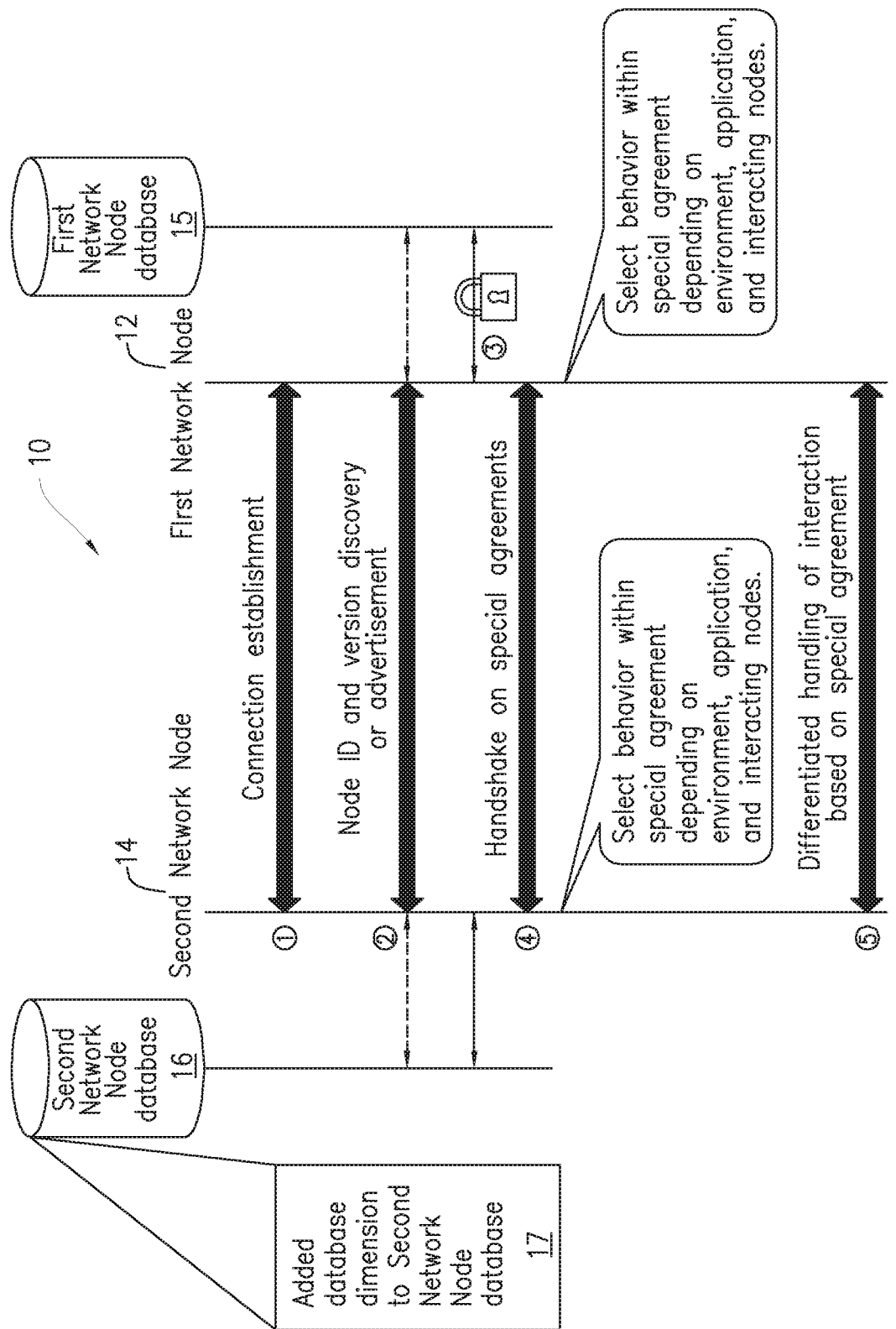
FIG. 1 is a block diagram of an exemplary communication link between two nodes constructed in accordance with aspects of the present disclosure.

Before describing in detail exemplary embodiments, it is noted that the embodiments reside primarily in combinations of apparatus components and processing steps related to a procedure and configuration that works within the communication standard, and allows two ends (i.e., nodes) of a communication link to agree on special (or multiple special) configurations in order provide a superior optimized solution. A network node can be either one of a general access node such as a base station, a relay station, an access point, etc., or a network device, such as user equipment (UE), a sensor, a mobile device, etc. The present disclosure provides the means and general structure for two ends of a communications link to establish a more optimized (or customized, or differentiated) configuration—also termed a "special inter-working" configuration. The objective is that the optimized configuration provides improved performance in one or multiple dimensions. The present disclosure may allow special inter-working for intra-vendor and inter-vendor solutions. i.e., where the same or different vendors provide the solution at either end of the communications link. The special inter-working agreement may allow configuration for operation outside the strict definition of the relevant communications standard. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, the present disclosure describes a generalized approach that allows nodes to interact with specialized agreements. The motivation for such a system considers at least the following: (1) To meet the upper limit of performance, bound by the appropriate communication standard, through close optimization and cooperative tuning of methods employed at one or both ends of a communication link; and (2) where possible, to exceed the performance that can be obtained when strictly following a standard, but at the same time, remain compatible with the ecosystem prescribed by the standard.

With regard to the present disclosure, at least two commercial network situations are considered. In the first situation, the two communicating partners (nodes) have been developed by different vendors. An inter-vendor business decision has been reached to cooperatively develop a solution add-on or optimization that works within, or beyond, the standard but provides better overall performance than can be achieved when the solution on each node is developed "in isolation."

The second situation is similar to the first, but in this case the same vendor develops both nodes. Practical examples of this could be: a VendorABC wireless device communicating with a VendorABC enhanced Node B (eNB) in a cellular network, or a VendorXYZ device communicating with another VendorXYZ device in a peer-to-peer machine-type-communication situation. In this second situation, the vendor has far greater latitude in developing their special add-on.

The present disclosure addresses peer-to-peer structures as well as hierarchically organized structures and is applicable to any communications medium and standard. Although embodiments are taken from cellular wireless technology, the present disclosure is not limited to only cellular wireless technology, but may be applied to other types of communication technologies.

Special agreements can address different layers of the Open Systems Interconnection (OSI) model, but in particular, they readily apply to physical and data link layers. The modifications controlled by the special agreement can be to the algorithms themselves, or to information exchanged, or how the information is presented/encoded, or all of the above. Any given special agreement can dictate different behaviors, which are dynamically selected by the nodes, depending on the environment. For example, the same special agreement can dictate one behavior when a node is static, versus a different behavior when the node is moving. In another example, different spectrum utilization methods could be applied depending on bandwidth demands of the application or node capability.

Interactions with other nodes (such as in cooperating multi-point receivers) also influence the selection of the behavior within the special agreement and potentially require knowledge of the multi-node interaction.

In all cases, nodes should be able to "default" to a pure standards based, and/or node agnostic, communication interaction so as to allow interoperability with nodes that are "outside" the special agreement. It is the responsibility of the node vendor (and the vendor's partner where appropriate) to confirm that "specials" are compatible within the standards eco-system. One example of an incompatibility would be violating emissions standards.

Before describing in detail exemplary embodiments that are in accordance with the disclosure, it is noted that the embodiments reside primarily in combinations of apparatus components and processing steps related to classification of reporting entities with special inter-node agreements. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

Referring now to drawing figures in which like reference designators refer to like elements there is shown in FIG. 1 an exemplary system "10" for classification of reporting entities with special inter-node agreements in accordance with some principles of the present disclosure. However, initially, components and other processes of system 10 will be described in detail with respect to FIG. 1 to provide a general understanding of the system and processes disclosed herein.

FIG. 1 is a block diagram of wireless communication system 10 according to an embodiment of the present disclosure. In this embodiment, first network node 12 and second network node 14 are communicating nodes and may be peer nodes or hierarchical. First network node 12 can be any kind of network node which may include a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc. Note that herein a base station is but one example of first network node 12. Implementations are not limited solely to base stations.

As used herein, second network node 14 need not be limited to a UE. Second network node 14 may be any type of device that is configured or configurable for communication through wireless communication. Examples of such wireless devices are sensors, modems, smart phones, machine type (MTC) devices a.k.a. machine to machine (M2M) devices, PDAs, iPADs, Tablets, smart phones, laptop embedded equipped (LEE), laptop mounted equipment (LME), USB dongles, etc.

This distinction mainly impacts how any customization decisions are made. In this embodiment, although first network node 12 and second network node 14 are shown, the nodes may be any network entity capable of communication with each other. Each node is associated with a respective database, i.e., first network node 12 is associated with database 15 and second network node 14 is associated with database 16. Each database stores the details about the special interactions for each potential communicating node in communication system 10. Each database can be local or remote. Any node that interacts with nodes from multiple vendors should control and keep secret specific vendor specials. Therefore, a database is optionally maintained as secure with controlled access, as is illustrated in FIG. 1, for example, for first network node 12.

Each network entity (i.e., first network node 12 and/or second network node 14) has its own database so that minimal information regarding the specialized agreements is exchanged over the interface between the nodes. This requirement serves both to limit the exposure of sensitive information as well as minimize the bits spent on establishing agreement.

Databases 15 and 16 can be updated to incorporate new information. Steps to update these databases may be as follows:

In step 1, first network node 12 and second network node 14 connect via the process specified by standards.

In step 2, first network node 12 and second network node 14 "discover" each other. Node identification is embodied in the node type, hardware ID, platform, and software release etc. Discovery can often be done through the standard, either explicitly or via vendor allowed fields which are incorporated into standards to allow proprietary communication between network elements. If a discovery structure does not exist within the given standard, a node can use an application that communicates with a peer application on the other node to exchange this information. Further, it is possible that the discovery itself be a "special," though in such as case a blind approach is required. Alternatively, the node ID may be discovered indirectly using ancillary information in conjunction with the database, as indicated by the dotted line in FIG. 1. Information that is learned can be stored in the database for future reference.

In step 3, the set of available specials is obtained from each database.

In step 4, handshaking between the nodes is used to confirm agreement on what "specials" to use. This step is taken as a precaution in case the databases are out of sync. If it could be assured that the databases are synchronized, then once the node IDs were established, the appropriate specials would be known.

In step 5, differentiated handling of the interaction of the network nodes within the communication network based on "specials" or specialized agreements occurs. In some embodiments, step 5 may follow step 4 after a certain period of time passes. In other words, the differentiated handling of interaction can be carried out at any time after the exchange of "specials" between cooperating first network node 12 and second network node 14 has occurred. Among others, the interaction type that is handled in a differentiated way based on specials may be a differentiated link establishment between nodes, based on additional knowledge obtained in preceding steps.

In one exemplary embodiment, addition to measurements related to RRM algorithms, other interaction types that are handled in a differentiated way based on special agreements could include the exchange of information, how the information is presented and/or encoded. Another example of differentiated interaction could be that the interpretation of bits contained an inter-node exchange (i.e., as part of the "special") can be unique (for example a logarithmic rather than linear mapping of a value), or that these bits may be applied to different purposes than originally intended by a standard (e.g., using some bits in an existing field for a unique purpose).

In one embodiment, the node discovery step (step 2) and the handshake step (step 4) can be combined into one step. In other embodiments, the discovery and/or handshake steps can use "blind" methods. No handshake is required if the special resides fully on one side of the inter-node relationship.

The present disclosure further provides categorization of first network node 12 and second network node 14 based on appropriately identified algorithm/feedback models for certain measurements, network-node-vendor-specific wireless node categorization, access/configuration of physical layer procedures associated with the categorized node, and classification of first network node 12 and second network node 14. In one embodiment, this may be based on how measurements made in first network node 12 and fed back to second network node 14 and vice versa, were obtained.

In one embodiment of the present disclosure, second network node 14 is a wireless device. i.e., UE, and first network node 12 is a base station, i.e., a eNB. The UE measurement algorithms are modified on the UE side based on the knowledge of the eNB category. Both the measurement algorithms on the UE side and the RRM algorithms on the eNB side are enabled to be adapted simultaneously based on the joint shared knowledge of the UE and eNB identity. This enables symbiotic strategic alliances between UE manufacturers and network equipment manufacturers. The present disclosure provides an approach where the UE database 16 includes an additional dimension, indicated by 17 in FIG. 2. This additional dimension 17 includes entries in database 16 associated with each eNB/UE pair, i.e. those entries specifying which measurement and RRM algorithms to use in the UE and eNB, respectively. In this fashion, by reading the information in database 16 with the added database dimension 17, both the UE and eNB can adapt their RRM/measurement strategy with a joint understanding of what the other is doing, to enhance the system performance.

The present disclosure allows for a eNB to change its behavior, and also change whatever UE behavior it controls, but it does not allow the UE to adapt aspects of its processing which are not directly controlled by the eNB, such as the measurement algorithms. The present disclosure allows the UE to adapt aspects of its processing which are not directly controlled by the eNB, with an understanding by the eNB that this will be done automatically because of the identity of the eNB. Such symbiotic adaptation of the measurements and of the RRM algorithms, without any other form of signaling than the sharing of the IDs of the node categories, is what is enabled by the present disclosure. Furthermore, since the algorithm is associated with the identity of nodes on both side of a link, proper algorithm selection can be done on a per-link basis, as opposed to a per-node basis, when multiple links are used to communicate to and/or from a node.

Another advantage of the present disclosure is improved key performance indicators ("KPIs"). In some instances, the targeted improved KPI is the system throughput resulting from adapting the RRM/measurement algorithms in a symbiotic way on both sides of the links. But it is also possible to improve other KPIs such as UE power saving aspects, if, for example, the RRM/measurement algorithms are adapted to increase opportunities for the UE to switch off its transmission ("TX") (optimized DTX scheme), or even fall in an idle mode. Further, performance differentiation through strategic alliances between equipment vendors could become more popular.

To address the above-mentioned database problem that occurs when establishment of the measurement category of a node only depends on the identity of one of the nodes in a communication link between two nodes and not upon the identity of the node which wishes to adapt its RRM strategy to the measurement done in the other node, an additional dimension 17 is added to the database 16 of the node doing the measurement.

The structure proposed in the present disclosure introduces a model category ID for the node selecting the associated RRM algorithm, i.e., first network node 12. In the example depicted in Table 1 below, if the model category ID of first network node 12 doing the RRM is "a." the output of database 16 is identical to the output that would have been obtained with a legacy database, but if the model category ID of first network node 12 doing the RRM is "b," and the model category ID of the node doing the measurement, i.e., second network node 14, is "x," both the measurement algorithm in node "x" and the RRM algorithm in node "b" are modified compared to what they would have been if the node doing the RRM was node "a." Such a database enables the manufacturers to form alliances and adapt their algorithms considering nodes on both sides of the communication link.

TABLE 1

| | Model category ID of the node doing the RRM | | | |
| --- | --- | --- | --- | --- |
| | a | | b | |
| Model category ID of node doing the measurements | Meas. alg. Category ID | RRM alg. ID | Meas. alg. Category ID | RRM alg. ID |
| x | w | z | ww | zz |
| xx | w | z | w | z |
| xxx | www | zzz | www | zzz |
| ... | ... | ... | ... | ... |

Nodes in communication system 10 are given access to the updated database 16 (with added dimension 17) if they are being made aware of the model identity IDs of the nodes which need to select proper measurement and RRM algorithms. To figure out the model identity IDs of the nodes is called a "discovery problem." To address the discovery problem, the present disclosure relies on existing information in existing databases, such as, in cellular networks, the database used by Operation & Maintenance ("O&M"), or Operation Support System, ("OSS"), which contains detailed information about the identity and software releases of network nodes, and the node-specific container of information in the MME/radio access network. The new database is actually an enhancement of the node-specific container of information in the MME/radio access network.

Figure 2:
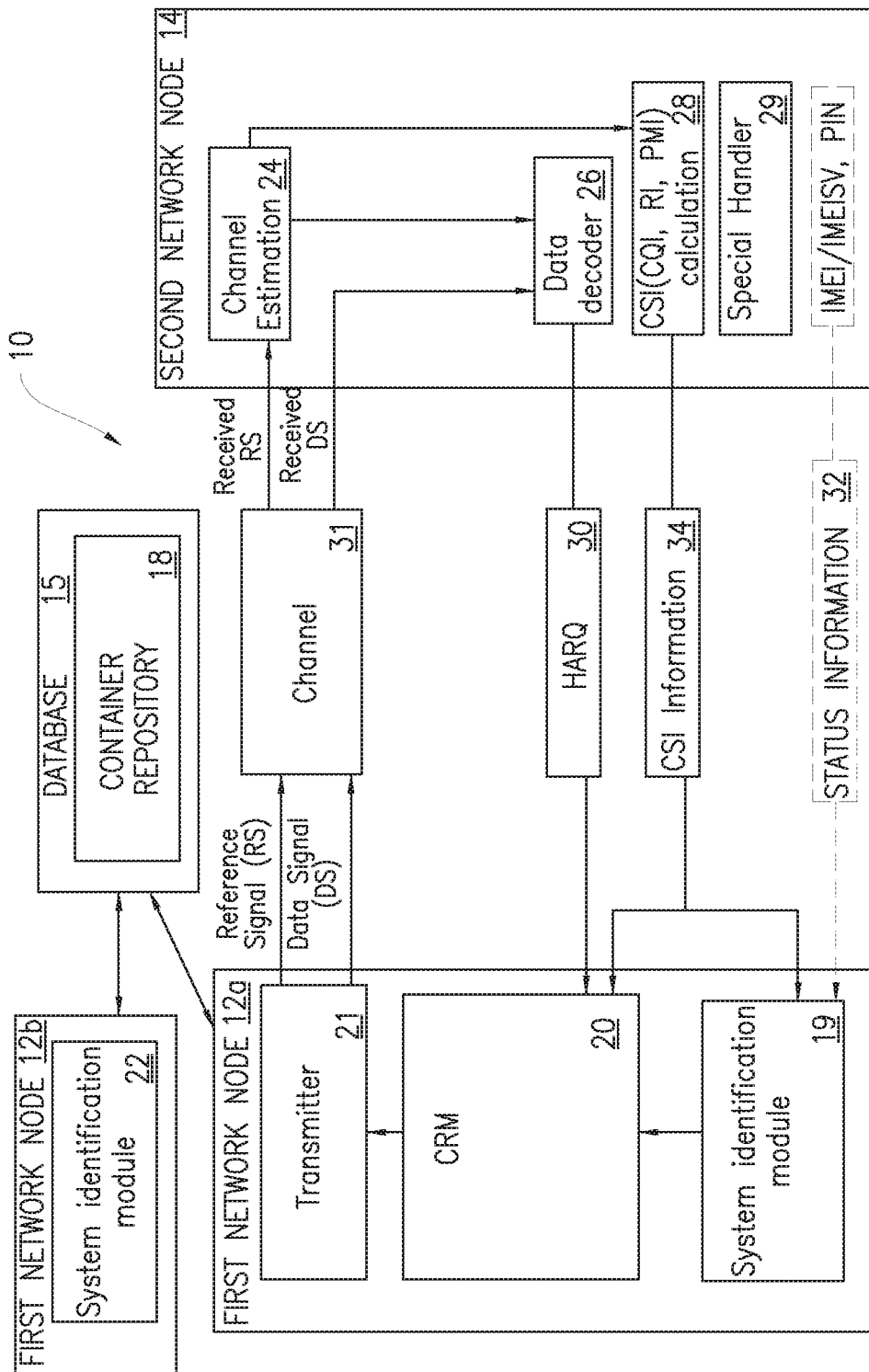
FIG. 2 is a block diagram of a portion of an exemplary communication system constructed in accordance with aspects of the present disclosure.

FIG. 2 is a block diagram of a portion of communication system 10 constructed in accordance with the principles of the present disclosure. While the present disclosure is not limited to a particular interaction type, communication algorithm or modifications controlled by special agreement, the example illustrated in FIG. 2 and discussed below relate to special agreements involving RRM measurements and RRM algorithms.

Communication system 10 includes first network nodes 12 such as first network nodes 12a and 12b (referred to collectively herein as first node 12). Herein, the terms "network node" and "node" are used interchangeably. For simplicity, only two first nodes 12a and 12b are shown in FIG. 2, it being understood that more or fewer than two first nodes 12 may be implemented. Communication system 10 also includes one or more second network nodes 14. For simplicity, only one exemplary second network node is shown in FIG. 2, it being understood that communication system 10 may include more than one second network node 14. Throughout this disclosure, the term "network entity" may be used to describe either first network node 12 or second network node 14. In other words, a first network node 12 and a second network node 14 can each be configured to perform the functions described herein for communication with the other.

The present disclosure includes embodiments which can be implemented in a network node such as a network capable wireless device, such UE. The term "network node" will be used herein to refer to a network node or a network capable wireless device. The network node herein can be the serving network node of the wireless device or any network node with which the wireless device can establish or maintain a communication link and/or receive information, e.g., via broadcast channel.

Communication system 10 also includes database 15. Database 15 includes a container repository 18, which represents a logical data storage element located in database 15. It is within the scope of the present disclosure that database 15 be considered any type of database including but not limited to any combination of one or more of a relational database, an operational database, or a distributed database. Further, database 15, including container repository 18, could be located within a mobility management entity (MME) or any other network element.

Container repository 18 may include network node capability information that includes information regarding the identity and capability of each second network node 14 to allow first network node 12 to establish and maintain efficient communications with second network node 14. This information may be maintained in communication system 10 during handovers. In addition, container repository 18 may be checked to see if there exists any network node measurement categories that second network node 14 should be associated with, based on measurement algorithms and the desired differentiation in the handling of second network node 14. If the handling of a new release of second network node 14 requires the creation of a new category, or the updating of an existing category that lacks the network node measurement characteristics, the category may be created and/or updated accordingly, and a specialized handling of the new second network node 14 may be defined.

In an exemplary embodiment, the system identification process performed by system identification module 19 evaluates the reported channel quality indication (CQI) as the downlink channel quality varies. In one embodiment, the downlink gain to interference plus noise ratio (GINR) is estimated at first network node 12 from the CQI reports sent from second network node 14. Some level of smoothing of the GINR may be done through filtering by a GINR filtering module to reduce the reported channel fluctuations due to fast fading and/or noise interference. The adequate level of filtering depends on the level of temporal filtering which was applied by second network node 14 to generate the CQI reports. However, the level of temporal filtering performed by second network node 14 may vary from network node vendor to network node vendor since this is not imposed by a standard. System identification module 19 may then determine the amount of filtering done by the measurement algorithm for second network node 14. Based on this information, the amount of filtering done in first network node 12 for the GINR associated with second network node 14 may be adjusted accordingly by an outer-loop adjustment module in a communication resource manager (CRM) 20.

Thus, instead of setting the same GINR filtering coefficients for all second network nodes 14, the filtering coefficients may advantageously be set appropriately for those particular second network nodes 14 identified as belonging to the same CQI reporting measurement category.

Using the above approach, container repository 18 within database 15 thus maintains a current view of network node-specific container content associated with measurement categories for each second network node 14. CRM 20 may then select or configure an appropriate CRM algorithm for second network node 14 in view of the specific handling needs necessary for each category.

In one embodiment, first network node 12 is a base station, such as an eNB. First network node 12 includes CRM 20, such as a radio resource manager (RRM), a transmitter 21, and system identification module 22. CRM 20 may also include a link adaptation module which may be configured for matching of modulation, coding, and/or other signal and protocol parameters to network conditions. CRM 20 may also include a scheduler which may be responsible for distributing resources such as time, frequency, and/or power among other requesting second network nodes 14 and first network nodes 12. Second network node 14 includes a channel estimation module 24, data decoder 26, a CSI calculation module 28 and a special handling module 29. In one embodiment, hybrid automatic repeat request (HARQ) 30 may be used as a high-rate forward error-correcting coding and automatic repeat request (ARQ) error-control mechanism.

First network node 12 and second network node 14 communicate with each other over a wireless communication channel 31. Reference signals and data signals are transmitted from transmitter 21 via a communication interface of first network node 12 over wireless communication channel 31. In one embodiment, CRM 20 may be used to provide radio RRM functionality for wireless communication channel 31. In one embodiment, wireless communication channel 31 is a multiple-input and multiple-output (MIMO) channel that allows transmission and receipt of more than one data signal on the same radio channel at the same time. The reference signal is received by channel estimation module 24 of second network node 14 and the data signal is received by data decoder 26. Status information 32 about each second network node 14 including, for example, any combination of its international mobile station equipment identity (IMEI), international mobile station equipment identity software version (IMEISV) and personal identification number (PIN) may, optionally, be fed back from each second network node 14 to first network node 12 and be used by first network node 12 to identify each second network node 14 according to their standard functionalities.

In one embodiment of the present disclosure, channel state information (CSI) information 34 is also obtained from each second network node 14 and fed back to first network node 12 through the communication interface of first network node 12. CSI information 34 is calculated in second network node 14, in particular within the CSI calculation module 28 and may include, for example, network node identity codes for the network node measurement classes, and/or network node class characterizations such as CQI offset or a pre-coding matrix indicator (PMI) or rank indicator (RI). CSI information 34 may then be used by system identification module 19 to further categorize each second network node 14 according to its respective channel measurement algorithm behavior.

Second network node 14 includes special handling module 29 since, as per the teachings of the present disclosure explained in further detail below, the measurement algorithms can now be modified based on the network node category ID and the network node category ID.

Figure 3:
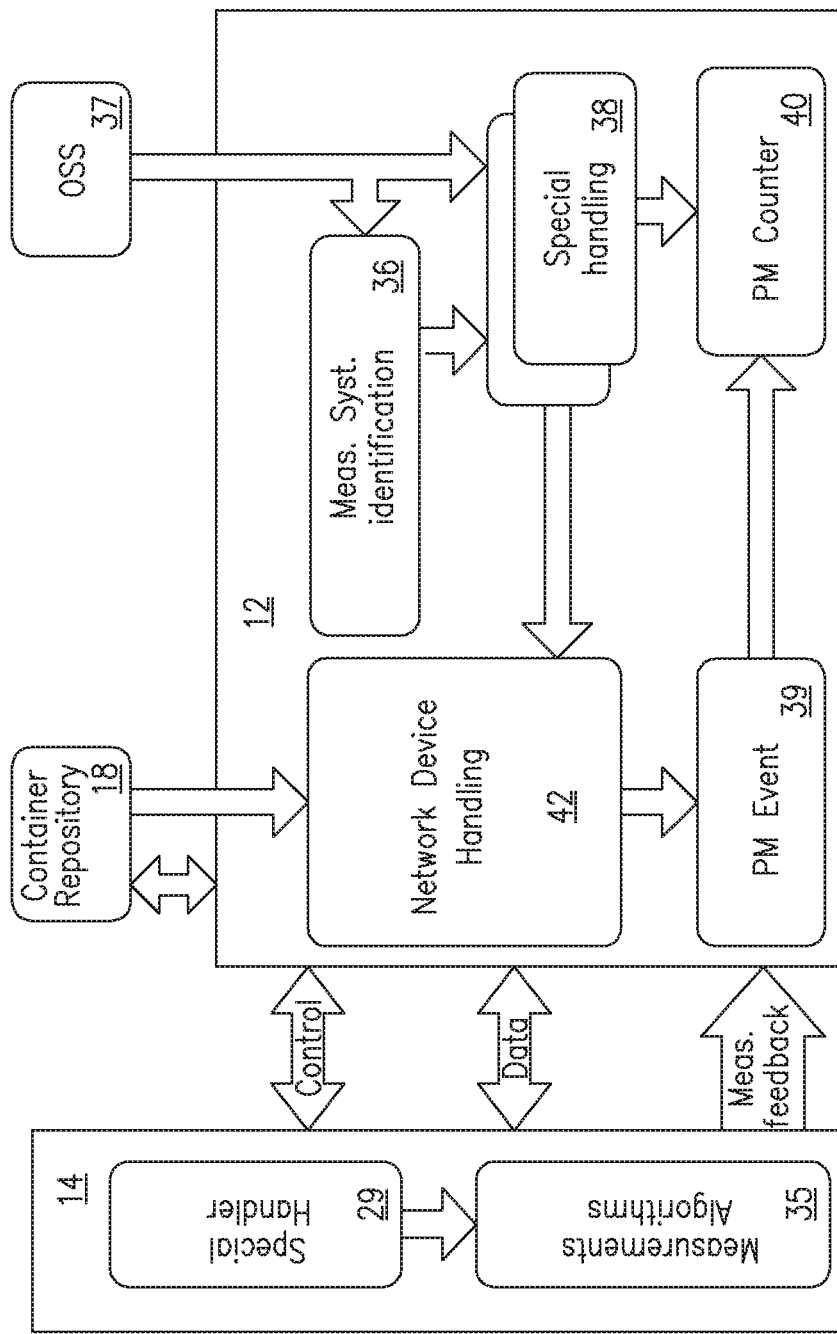
FIG. 3 is a block diagram of an exemplary wireless network node including a special handling module constructed in accordance with aspects of the present disclosure.

FIG. 3 illustrates an embodiment of the present disclosure in the context of differentiated wireless node handling. Second network node 14 is a wireless device and is in communication with first network node 12, which, in this embodiment, is a base station, such as an eNB. Wireless device 14 and base station 12 exchange control and data signals. Measurement information is also obtained by base station 12. The measurement information includes measurement algorithms 35 for wireless device 14. Measurement algorithms 35 may include, for example, an estimate of the power received by base station 12. This is obtained by averaging the magnitude squared of the channel estimate over a certain time and/or frequency interval. In other embodiments, measurement algorithms 35 may include, instead of power, the signal-to-interference-plus-noise ("SINR").

Measurement algorithms 35 are used by system identification module 36 located in base station 12 to provide special handling of each wireless device 14 through the use of measurement categories for each wireless device 14 sharing the same measurement algorithms. Operation support system (OSS) 37 configures system identification module 34 and special handling module 36. OSS 37 may, for example, be used to add a measurement class or category and any new special handling rules for the newly created class or category. Special handling module 38 may influence how performance monitor (PM) events 39 are used to generate PM counter 40. In one embodiment, PM counter 40 could count the number of PM events 39 associated with certain classes or categories of wireless devices 14 separately.

Base station 12 includes a network device handling module 42, which uses standard status information for each wireless device 14. Wireless device 14 may include special handler 29 since the measurement algorithms 35 that can now be modified based on the wireless device category ID and the base station category ID. The mapping between the base station ID and the proper base station category ID is stored in the base station 12 and used to access the proper information in the database having the added dimension 17 (shown in FIG. 1). Note that this mapping between the base station ID and the category ID only needs to be made initially, or if there is a deployment update, such as a software update of a given set of nodes, which justifies re-categorization. In such a case, a mechanism should be put in place to trigger an update. This mapping update would be pushed from the OSS 37 at the same time as the deployment update. In addition to the mapping from the base station ID to the base station category ID, there should be a mapping from the wireless device ID to the wireless device category ID. The information to do such mapping is in the wireless device information container in the container repository 18.

So the base station 12 can directly use the wireless device ID and the cell category ID to fetch the proper algorithms to use (for measurements and RRM) in the new database, which is centrally control/managed in the container repository 18, but could be partially replicated to local nodes for faster access.

There also should be a mechanism to do an update on the wireless device category ID if a new RRM algorithm is used, or measurement algorithm update is made, which would justify re-categorization of wireless device 14. The process to do re-categorization includes creating a new wireless device category because of an RRM algorithm change, and/or because of a measurement algorithm change, and the new wireless device category could result in the change or creation of a lot of entries in the database 16 because the database 16 has entries for wireless device/base station pairs (i.e., dimension 17), not only for wireless device categories, as before. Wireless device algorithmic changes may require a firmware upgrade to be pushed to the devices by the manufacturer (at the application layer). Because not all nodes will upgrade simultaneously in practice, one will not be able to "recycle" the RRM and measurement algorithm IDs directly, new IDs will be required to avoid ambiguity.

Figure 4:
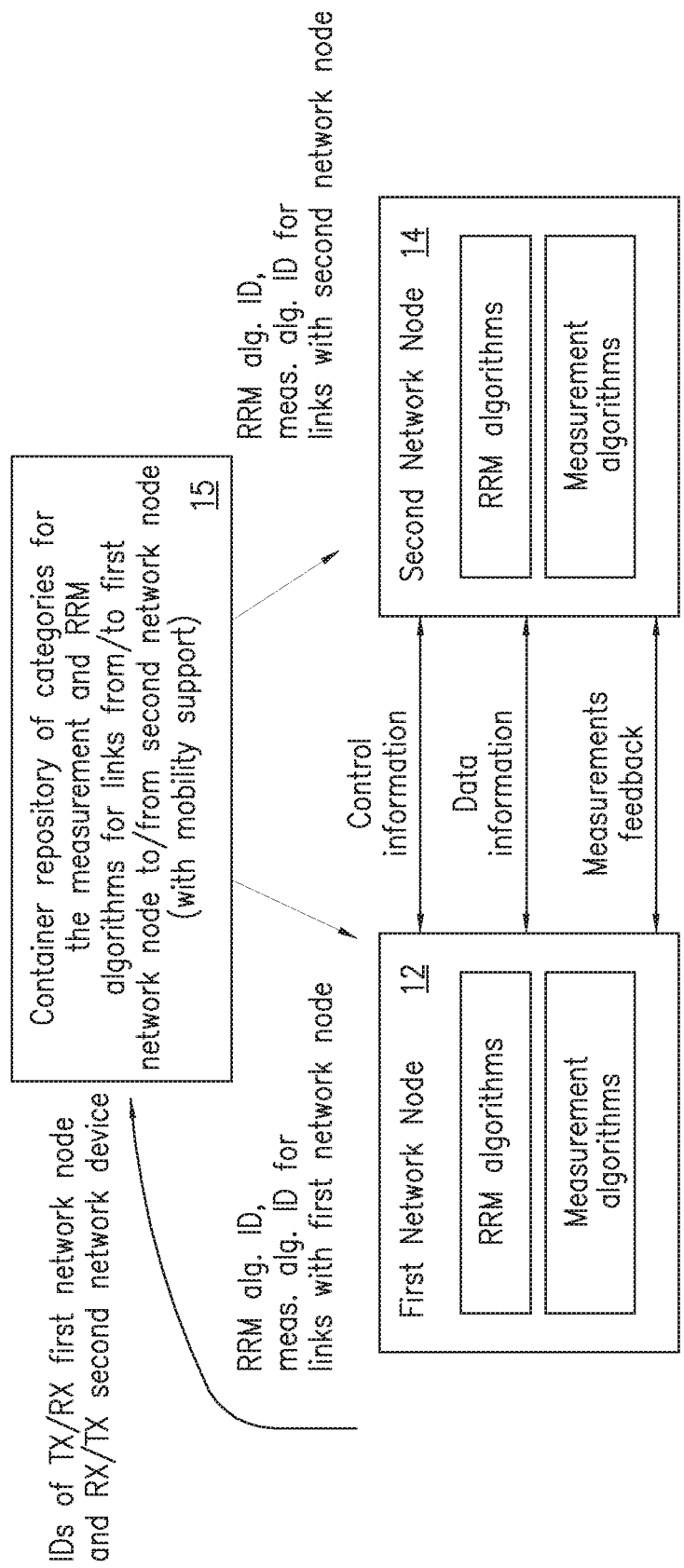
FIG. 4 is a block diagram showing two nodes with access to a database having an added database of categories in accordance with aspects of the present disclosure.

The present disclosure is not restricted to the wireless device/base station or the eNB/UE cellular context. The present disclosure covers the generic case for which the RRM optimization based on the categorization of measurement and RRM algorithms can reside on either of the nodes on both sides of the communication link. This is illustrated in the embodiment depicted in FIG. 4. In this embodiment, first network node 12 and second network node 14 each include RRM algorithms and measurement algorithms and each has access to a database of categories for the measurement and RRM algorithms for links from/to first network node 12 and to/from second network node 14, with mobility support. Thus, first network node 12 has access to the RRM algorithm ID and measurement algorithm ID for links with first network node 12 while second network node 14 has access to the RRM algorithm ID and measurement algorithm ID for links with first network node 12. Container repository 15 is configured to store the categories for the measurement and RRM algorithms for links from/to first network node 12 and second network node 14.

Figure 5:
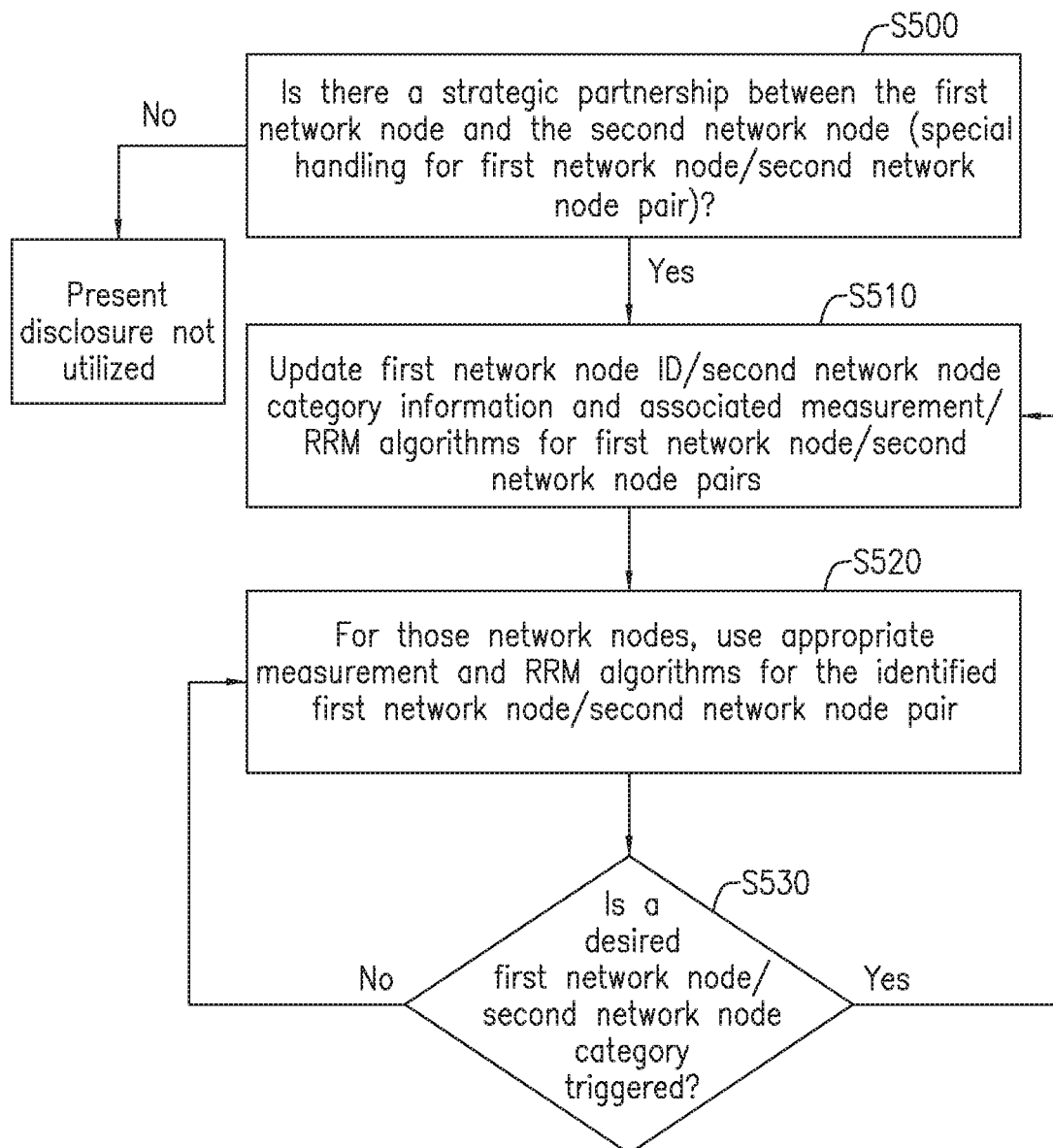
FIG. 5 is a flowchart showing an exemplary embodiment of the present disclosure.

FIG. 5 illustrates an exemplary process utilizing the principles of the present disclosure. For a first network node 12 with which a second network node 14 is communicating, it is determined that there a strategic partnership, in other words, special handling for a first network node 12/second network node 14 pair, and the container repository 18 contains the first network node 12 and second network node 14 and node category information with associated measurement/RRM algorithms on both the first network node 12 and the second network node 14 (step S500). The first network node 12/second network node 14 category information and associated measurement/RRM algorithms for first network node 12/network second node 14 pairs are updated (facilitated by strategic alliance cooperation) (step S510). The updates are pushed to container repository 18/first network nodes 12/second network nodes 14 through OSS and possibly wireless node manufacturer firmware updates. For those nodes, the appropriate measurements and RRM algorithms for the identified first network node 12/second network node 14 pair are used (step S520). If there is a desired first network node 12/second network node 14 category update that is triggered (step S530), the process reverts back to step S510. If there is no desired first network node 12/second network node 14 category update that is triggered, then the process reverts back to step S520.

Figure 6:
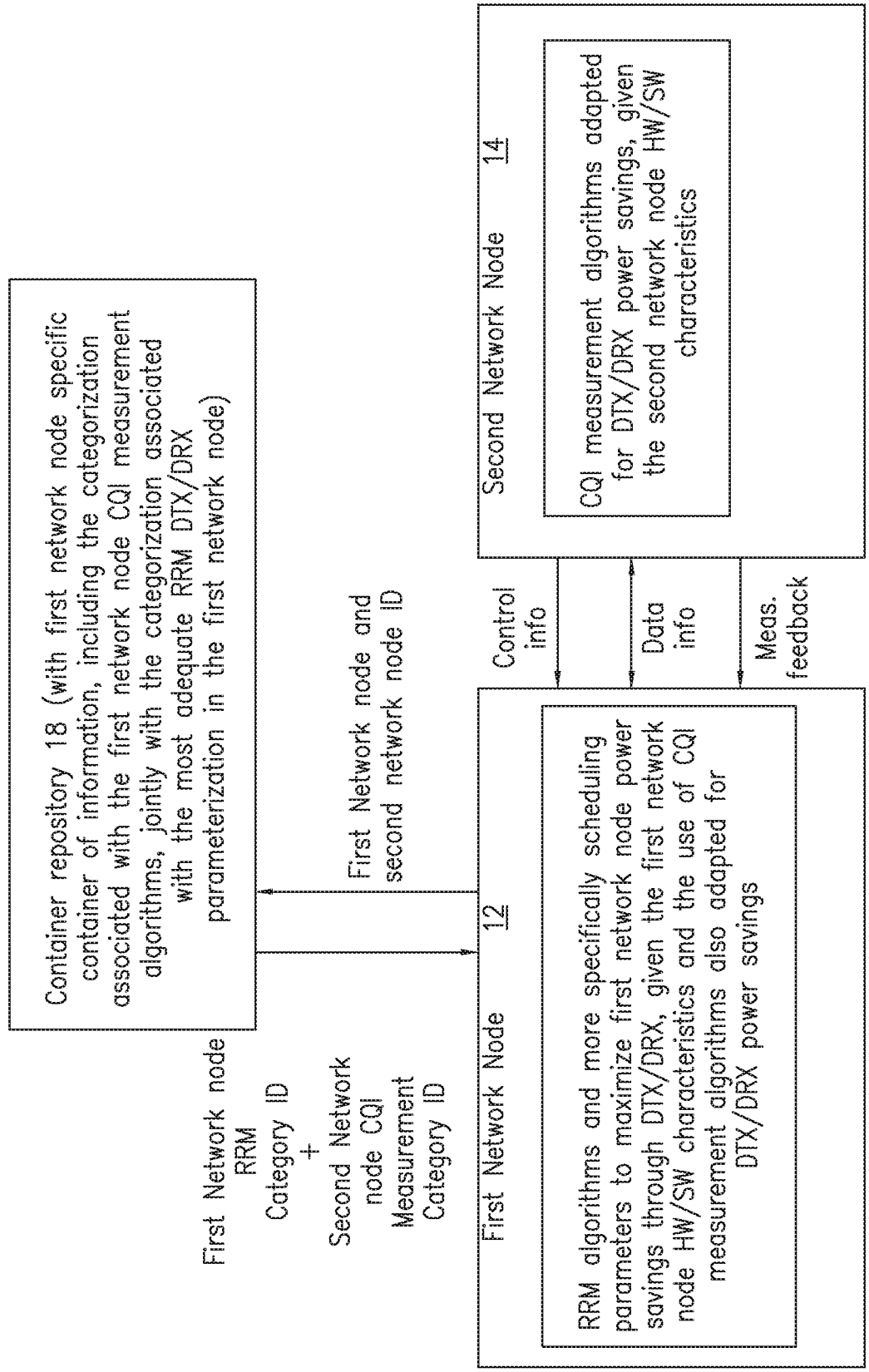
FIG. 6 is a block diagram showing an embodiment of the present disclosure in a cellular environment.

FIG. 6 describes an embodiment of the present disclosure in the cellular environment tailored for the joint selection of the channel quality indicator (CQI) measurement algorithms in the network node, and the associated appropriate RRM algorithms. More specifically, this embodiment refers to scheduling parameters to maximize wireless device power savings through discontinuous transmission (DTX)/discontinuous reception (DRX), given the network node's hardware and/or software characteristics, and the use of CQI measurement algorithms also adapted for DTX/DRX power savings. Such a strategy requires a strategic agreement between the first network node 12 and second network node 14 manufacturers since it requires close coordination to align the algorithms in second network node 14 and first network node 12. The wireless node manufacturer would study different RRM approaches in the context of power savings, and select measurement and scheduling algorithms which provide a reasonable compromise between power efficiency and throughput efficiency. This can be very wireless node implementation specific. A power consumption model of the power amplifier(s) in a multi-RAT/multi-band capable wireless node could be used, with a power consumption profile which would capture the possible savings associated with switching off the transmissions in certain bands, as a function of duration. For example, the model could determine that switching on/off at a TTI-level is not as power-saving efficient as switching off for extended durations, or that distributing frequency resources over multiple power amplifier instead of possibly allowing a power amplifier to switch off is not as power efficient.

There is also a throughput performance model which would cover the fact that some diversity gains could be lost by the fact that, if no transmission occurs for certain time/frequency resources, the channel cannot be estimated, so that the channel and interference estimation/prediction necessary for RRM might not be as accurate. Thus, a point of operation should be dynamically chosen which achieves an acceptable tradeoff between energy efficiency and acceptable user quality of experience (perceived throughput), given the traffic and channel conditions. As an example, the RRM module would know that a single band is enough, it would also know which band is a good choice based on the HW/SW implementation of the wireless node and the channel conditions, it would pick the bands and select an appropriate sounding strategy to maximize power efficiency while still allowing for proper channel prediction. The measurement algorithms would be picked to maximize the channel prediction capabilities, even with a cross-band perspective given the channel correlation across bands.

As illustrated in FIG. 6, first network node 12 maintains RRM algorithms and scheduling parameters to maximize network node power savings given the network node's hardware and software characteristics. Second network node 14 maintains CQI measurement algorithms configured to provide power savings given the network node's hardware and software characteristics. Container repository 18 maintains a network node specific container of information, including categorization associated with the network node CQI measurement algorithms, jointly with the categorization associated with the most adequate RRM parameterization in first network node 12.

Figure 7:
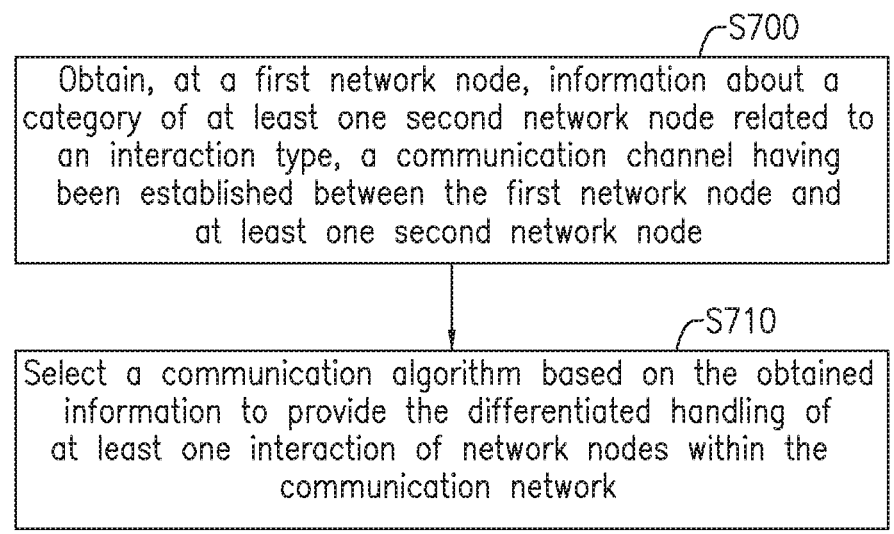
FIG. 7 is a flowchart illustrating another embodiment of the present disclosure.

FIG. 7 is a flowchart illustrating an embodiment of the present disclosure. Specifically, a method for differentiated handling of one or more interactions of network nodes within a communication network is provided. The method includes obtaining, at a first network node, information about a category of at least one second network node related to an interaction type, a communication channel having been established between the first network node and the at least one second network node (Block S700). The method also includes selecting a communication algorithm based on the obtained information to provide the differentiated handling of the at least one interaction of network nodes within the communication network (Block S710).

In some embodiments, the method illustrated in FIG. 7 further includes implementing the communication algorithm. In some embodiments, the communication algorithm is a measurement algorithm. In some embodiments, the information about the category of the at least one second network node is obtained via signaling between the first node and the at least one second network node.

In some embodiments, the method illustrated in FIG. 7 further includes handshaking with the at least one second network node regarding the selection of the communication algorithm. In some embodiments, the information about the category of at least one second network node is obtained from a container repository located at a third network node. In some embodiments, the information about the category of the at least one second network node is obtained from a container repository provided in a memory at the first network node.

In some embodiments, the method illustrated in FIG. 7 further includes determining a first category for the first network node, determining a second category for the at least one second network node based on the obtained information, creating a pairing entry in a container repository, the pairing entry including a pairing of the first category for the first network node with the second category for the at least one second network node, and identifying the communication algorithm based at least on the pairing entry. In some embodiments, the interaction type is a differentiated link establishment between the first network node and at least one of the at least one second network node. In some embodiments, the interaction type is providing link quality information. In some embodiments, the category is a type of the at least one network node. In some embodiments, the category is a user identity of the at least one second network node.

Figure 8:
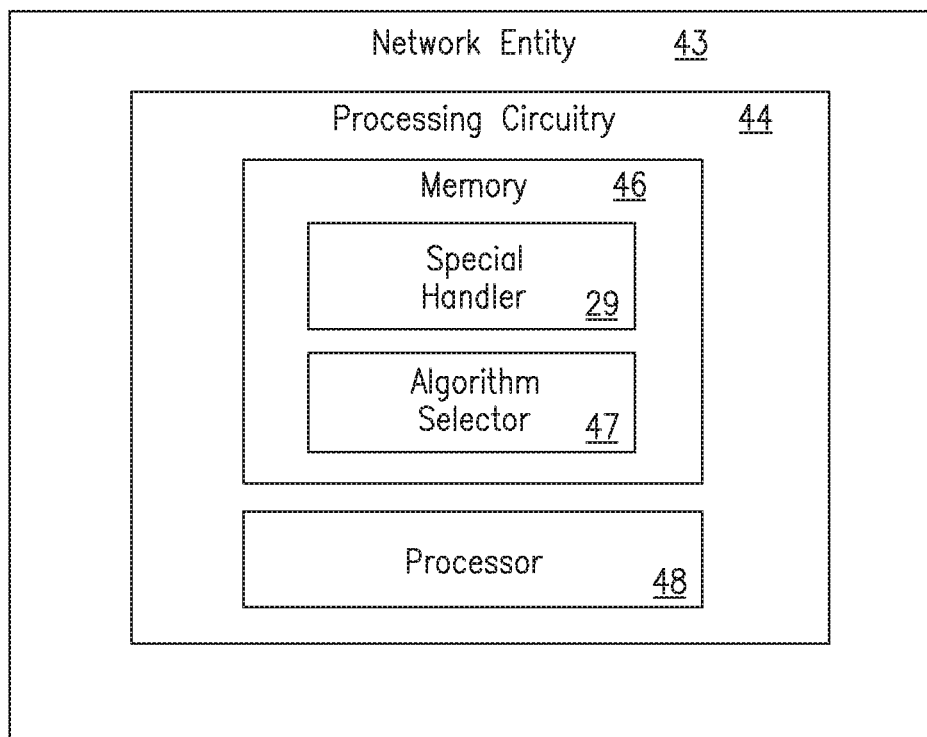
FIG. 8 is a block diagram of a network entity configured to perform the functions illustrated in FIG. 7.

FIG. 8 is a block diagram of a network entity 43 incorporating principles of the present disclosure. Network entity 43 could be, for example, a second network node 14 which is in communication with another node in communication system 10 such as, for example a first network node 12 such as a base station. Network entity 43 could also be, for example, a first network node 12, which is in communication with another node in communication system 10 such as, for example a second network node 14. Specifically, network entity 43 is configured for differentiated handling of one or more interactions of network nodes within a communication network. Network entity 43 includes processing circuitry 44, which includes memory 46, including special handler 29. Memory 46 is in communication with processor 48. Memory 46 includes instructions that, when executed by processor 48, configure processor 48 to execute special handler 29 configured to obtain information about a category of one or more second network nodes related to an interaction type, a communication channel having been established between a first network node and the at least one second network node, and to select a communication algorithm based on the obtained information to provide the differentiated handling of the at least one interaction of network nodes within the communication network. Memory 46 includes algorithm selector 47 which may perform the function of selecting the communication algorithm based on the obtained information to provide the differentiated handling of the at least one interaction of network nodes within the communication network.

In some embodiments, memory 46 further stores instructions that, when executed, configure processor 48 to implement the communication algorithm. In some embodiments, the communication algorithm is a measurement algorithm. In some embodiments, the information about the category of the at least one second network node is obtained via signaling between the network entity 43 and the at least one second network node. In some embodiments, processor 48 is further configured to handshake with the at least one second network node regarding the selection of the communication algorithm. In some embodiments, the information about the category of the at least one second network node is obtained from a container repository located at a third network node. In some embodiments, the information about the category of the at least one second network node is obtained from a container repository provided in memory 46.

In some embodiments, memory 46 further stores instructions that, when executed, configure processor 48 to determine a first category for the first network node, determine a second category for the at least one second network node based on the obtained information, create a pairing entry in a container repository, the pairing entry including a pairing of the first category for the first network node with the second category for the at least one second network node, and identify the communication algorithm based at least on the pairing entry. In some embodiments, the interaction type is a differentiated link establishment between the network entity 43 and at least one of the at least one second network node. In some embodiments, the interaction type is providing link quality information. In some embodiments, the category is a type of the at least one second network node. In some embodiments, the category is a user identity of the at least one second network node.

Figure 9:
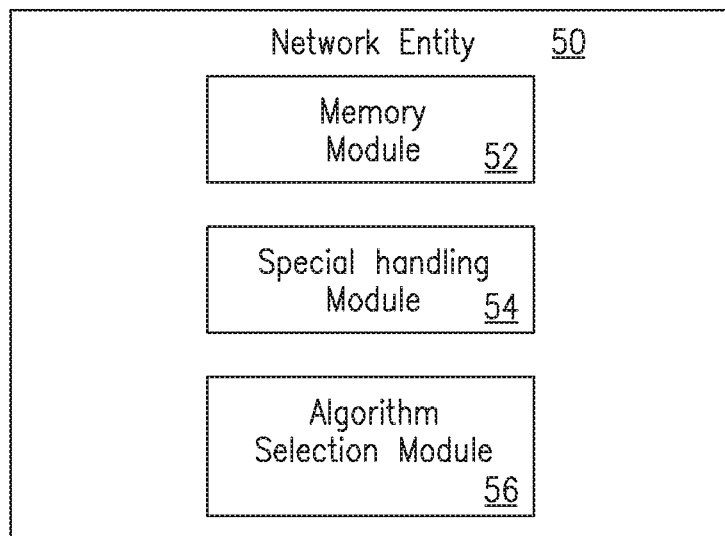
FIG. 9 is a block diagram of an alternate embodiment of a network entity configured to perform the functions illustrated in FIG. 7.

FIG. 9 a block diagram of an alternate network entity incorporating principles of the present disclosure. Network entity 50 could be, for example, a second network node 14 which is in communication with another node in communication system 10 such as, for example a first network node 12 such as a base station. Network entity 50 could also be, for example, a first network node 12, which is in communication with another node in communication system 10 such as, for example a second network node 14. Network entity 50 includes a memory module 52 and a special handling module 54. Special handling module 54 is configured to obtain, at a first network node, information about a category of at least one second network node related to an interaction type, a communication channel having been established between the first network node and the at least one second network node. Network entity 50 also includes an algorithm selection module 56 which is configured to select a communication algorithm based on the obtained information to provide the differentiated handling of the at least one interaction of network nodes within the communication network.

Figure 10:
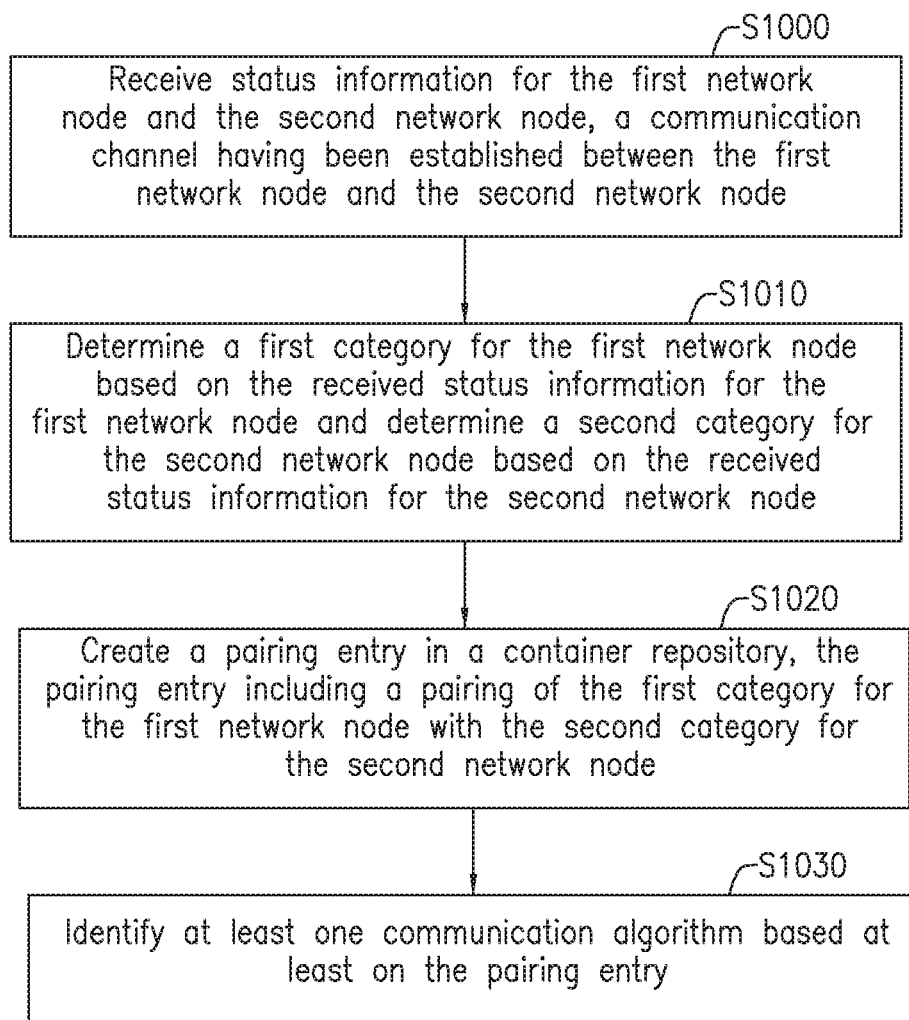
FIG. 10 is a flowchart illustrating the pairing of first and second categories in a container repository according to another embodiment of the present disclosure.

FIG. 10 is a flowchart illustrating the pairing of first and second categories in a container repository 18 according to another embodiment of the present disclosure. The process illustrated in FIG. 10 relates to a method for determining at least one communication algorithm for communication between a first network node 12 and a second network node 14. The method could be performed, for example, by container repository 18 or any other network entity. Status information for the first network node 12 and the second network node 14 is received, where a communication channel has been established between the first network node 12 and the second network node 14 (Block S1000). This status information could include, for example, static information such as identification information as well as other information used to determine a "category." For example, other dynamic or semi-static information such as information related to software upgrades, and/or hardware module replacements in a modulated node can also qualify as "status information" used to determine a category. A first category for the first network node 12 is determined based on the received status information for the first network node 12 and a second category for the second network node 14 is determined based on the received status information for the second network node 14 (Block S1010). A pairing entry is created in container repository 18, the pairing entry including a pairing of the first category for the first network node 12 with the second category for the second network node 14 (Block S1020). At least one communication algorithm is then identified based at least on the pairing entry (Block S1030).

In some embodiments, the method illustrated in FIG. 10 further includes implementing the at least one communication algorithm. In some embodiments, at least a portion of the container repository 18 containing the pairing entry resides in at least one of the first network node 12 and the second network node 14. In some embodiments, the at least one communication algorithm is a resource management algorithm usable by the first network node 12. In some embodiments, the at least one communication algorithm is a measurement algorithm usable by the second network node 14.

In some embodiments, the method illustrated in FIG. 10 further includes receiving notification of a modification of the communication algorithm, updating the second category for the second network node 14 based on the modification, and creating an updated pairing between the first category for the first network node 12 and the updated second category for the second network node 14.

In some embodiments, the method illustrated in FIG. 10 further includes mapping at least one of the status information for the first network node 12 with the first category for the first network node 12 and the status information for the second network node 14 with the second category for the second network node 14 in order to access the pairing entry in the container repository 18. In some embodiments, the mapping is stored in the first network node 12.

Figure 11:
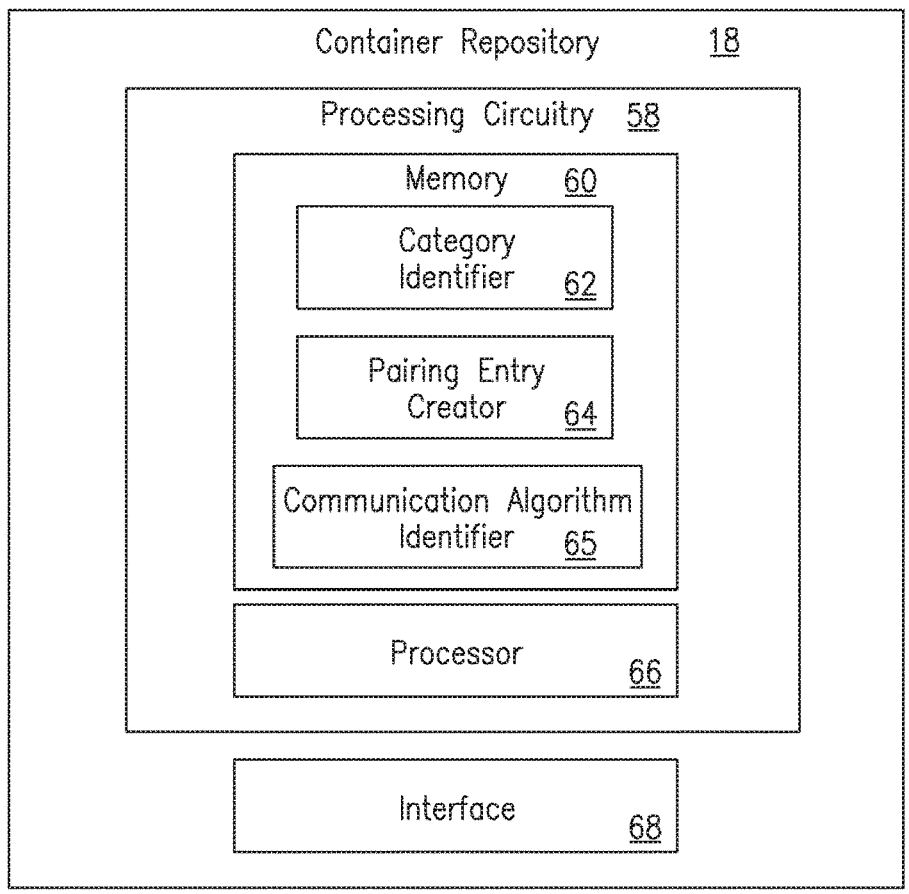
FIG. 11 is a block diagram of a container repository configured to perform the functions illustrated in FIG. 10.

FIG. 11 is a block diagram of a container repository 18 configured to perform the functions illustrated in FIG. 10. Container repository 18 or some other network entity is configured to determine at least one communication algorithm for communication between a first network node and a second network node. Processing circuitry 58 includes a memory 60, which may also include category identifier 62, pairing entry creator 64 and communication algorithm identifier 65. Container repository 18 also includes a processor 66, where memory 60 is in communication with processor 58. Memory 60 includes instructions that, when executed by processor 58, configure processor 58 to perform a variety of functions. These functions may include determining a first category for the first network node 12 based on the received status information for the first network node 12 and determining a second category for the second network node 14 based on the received status information for the second network node 14. Alternately, category identifier 62 may perform the determination of the category for the first network node 12 based on the received status information for the first network node 12 and the determination of a second category for the second network node 14 based on the received status information for the second network node 14. In another embodiment, the category determination may be performed by both processor 66 and category identifier 62. Pairing entry creator 64 either alone or with processor 58 is configured to create a pairing entry, the pairing entry including a pairing of the first category for the first network node 12 with the second category for the second network node 14. Container repository 18 is configured to store the pairing entry in memory 60. In other embodiments, the pairing entry may be stored in another database or memory located apart from container repository 18. Communication algorithm identifier 65 is configured to identify at least one communication algorithm based at least on the pairing entry. Container repository 18 also includes an interface 68 configured to receive status information for the first network node 12 and status information for the second network node 14, a communication channel having been established between the first network node 12 and the second network node 14.

In some embodiments, memory 60 further stores instructions that, when executed, configure processor 66 to implement the at least one communication algorithm. In some embodiments, at least a portion of container repository 18 containing the pairing entry resides in at least one of the first network node 12 and the second network node 14. In some embodiments, the at least one communication algorithm is a resource management algorithm usable by the first network node 12.

In some embodiments, the at least one communication algorithm is a measurement algorithm usable by the second network node 14. In some embodiments, upon receipt by the interface of a notification of a modification of the communication algorithm, memory 60 further stores instructions that, when executed, configure processor 66 to update the second category for the second network node 14 based on the modification, and create an updated pairing between the first category for the first network node 12 and the updated second category for the second network node 14.

In some embodiments, memory 60 further stores instructions that, when executed, configure processor 66 to map at least one of the status information for the first network node 12 with the first category for the first network node 12 and the status information for the second network node 14 with the second category for the second network node 14 in order to access the pairing entry in the container repository. In some embodiments, the mapping is stored in the first network node 12.

Figure 12:
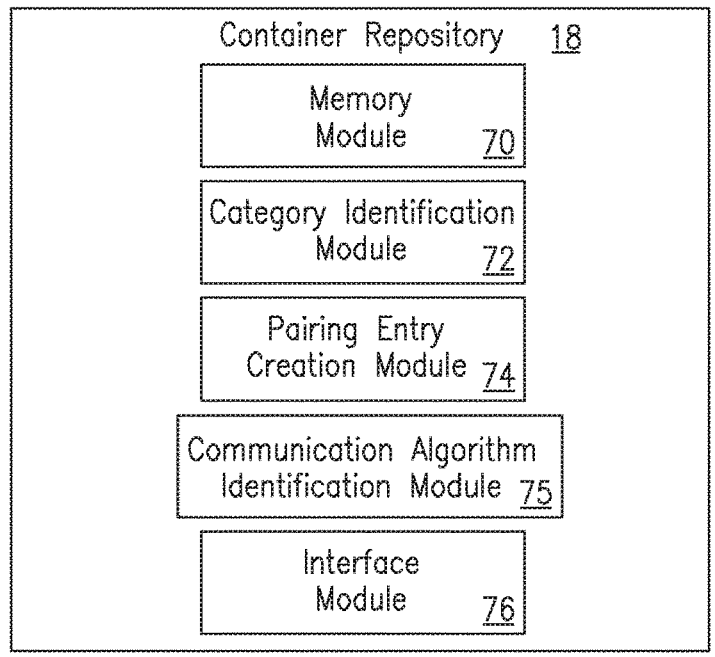
FIG. 12 is a block diagram of an alternate embodiment of a container repository configured to perform the functions illustrated in FIG. 10.

FIG. 12 is a block diagram of an alternate embodiment of a container repository 18 configured to perform the functions illustrated in FIG. 10. Container repository 18 or some other network entity is configured to determine at least one communication algorithm for communication between a first network node 12 and a second network node 14. Container repository 18 may also include a memory module 70, a category identification module 72, a pairing entry creation module 74, a communication algorithm identification module 75, and an interface module 76 configured to receive status information for the first network node 12 and status information for the second network node 14, a communication channel having been established between the first network node 12 and the second network node 14. Category identification module 72 is configured to determine a first category for the first network node 12 based on the received status information for the first network node 12 and determining a second category for the second network node 14 based on the received status information for the second network node 14. Pairing entry creation module 74 is configured to create a pairing entry, the pairing entry including a pairing of the first category for the first network node 12 with the second category for the second network node 14. Container repository 18 is configured to store the pairing entry in memory module 70. In other embodiments, the pairing entry may be stored in another database or memory located apart from container repository 16. Communication algorithm identification module 75 is configured to identify at least one communication algorithm based at least on the pairing entry.

Figure 13:
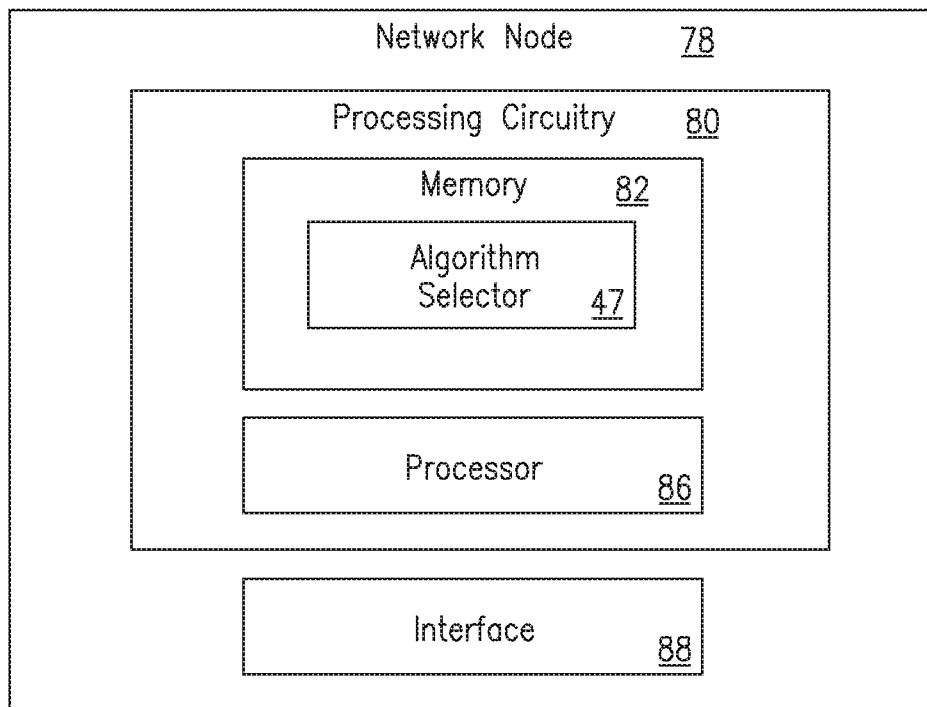
FIG. 13 is a block diagram of a network entity configured to select a communication algorithm based on received status information according to another embodiment of the present disclosure.

FIG. 13 is a block diagram of a network entity configured to select a communication algorithm based on received status information according to another embodiment of the present disclosure. In one embodiment, the network entity of FIG. 13 is a third network node 78 for selecting at least one communication algorithm for communication with a second network node. Third network node 78 could be, for example, a network node which is in communication with another node in communication system 10 such as, for example a first network node 12 such as a base station. Third network node 78 could also be, for example, a first network node 12, which is in communication with another node in communication system 10 such as, for example a second network node 14. Third network node 78 includes processing circuitry 80, which includes memory 82. Memory 82 may include algorithm selector 47. Third network node 78 also includes a processor 86 in communication with memory 82, and an interface 88 configured to forward status information for the third network node 78 and status information for the second network node 14 to container repository 18 or other network entity, where a communication channel has been established between the third network node 78 and the second network node 14. Interface 88 is also configured to receive status information identifying at least one communication algorithm for at least one of the third network node 78 and the second network node 14, the status information being based on a paring entry in container repository 18. The paring entry includes a pairing of a first category for the third network node 78 with a second category for the second network node 14. Memory 82 includes instructions that, when executed by processor 86, configure processor 86 to select the identified at least one communication algorithm based on the received status information. Alternately, algorithm selector 47 in memory 82 may perform the function of selecting the identified at least one communication algorithm based on the received status information. Further, the function of selecting the identified at least one communication algorithm based on the received status information may be performed by some combination of algorithm selector 47 and processor 86. Thus, the algorithm selector 47 may perform the functions as described above with respect to FIG. 8 and the functions described with respect to FIG. 13.

In some embodiments, third network node 78 further includes container repository 18. In some embodiments, at least a portion of the container repository 18 containing the pairing entry resides in at least one of the third network node 78 and the second network node 14. In some embodiments, memory 82 further stores instructions that, when executed, configures processor 86 to implement the at least one communication algorithm. In some embodiments, the at least one communication algorithm is a resource management algorithm usable by the third network node 78. In some embodiments, at least one communication algorithm is a measurement algorithm usable by the second network node 14.

Figure 14:
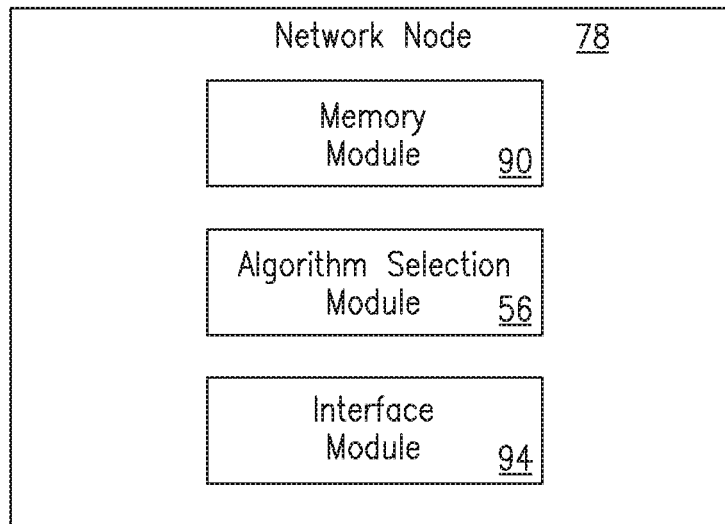
FIG. 14 is a block diagram of an alternate embodiment of a network entity configured to select a communication algorithm based on received status information according to another embodiment of the present disclosure.

FIG. 14 is a block diagram of an alternate embodiment of a network entity configured to select a communication algorithm based on received status information according to another embodiment of the present disclosure.

In one embodiment, the network entity of FIG. 14 is a third network node 78 for selecting at least one communication algorithm for communication with a second network node 14. Third network node 78 includes a memory module 80, algorithm selection module 56 and an interface module 94 configured to forward status information for the third network node 78 and status information for the second network node 14 to container repository 18 or other network entity, where a communication channel has been established between the third network node 78 and the second network node 14. Interface module 94 is also configured to receive status information identifying at least one communication algorithm for at least one of the third network node 78 and the second network node, the status information being based on a paring entry in container repository 18. The paring entry includes a pairing of a first category for the third network node 78 with a second category for the second network node 14. Third network node 78 also includes algorithm selection module 56 which may perform the function of selecting the identified at least one communication algorithm based on the received status information. Thus, algorithm selection module 56 may perform the functions as described above with respect to FIG. 9 and the functions described with respect to FIG. 14.

The above discussion relates to a first network node 12/second network node 14, i.e., a UE/eNB scenario for the sake of simplicity, but the present disclosure actually supports RRM and measurement algorithm selection on both sides of a communication link based on a strategic agreement between the manufacturers of the nodes on both sides of the link. The database in the context of the UE/eNB scenario is presented as residing in the container repository 18 (i.e., MME) and replicated at least partially in other nodes, or actually distributed fully between the MME and other nodes. Still, the present disclosure covers the more general context of communication between any nodes, supported by any database, centralized or non-centralized, with mobility support, if needed.

It should be noted that the ID of the nodes for which the database query is made could be explicitly signaled, or implicitly signaled.

In one embodiment, the present disclosure widens the special wireless node handling with a first network node 12/second network node 14 category pair-specific information in the second network node 14-specific container in the container repository 18 to cover categorization of the wireless node channel state information (CSI) measurement algorithms and associated network node RRM algorithms in a joint manner.

In another embodiment, from the identified jointly appropriate second network node 14 channel CSI measurement algorithms category and associated first network node 12 RRM algorithms category, the present disclosure adds, on the first network node 12 side, functionality in the RRM, and on the second network node 14 side, functionality in the measurement configuration procedures, which would allow the system to adapt symbiotically the RRM and measurement algorithms/process to the identified categories.

Some of the embodiments disclosed herein are related to the second network node 14 power saving characteristics with DTX/DRX for a given second network node 14 HW/SW implementation, and the associated RRM strategy on the first network node 12 side to maximize the power saving opportunities for the specific second wireless node 14 characteristics.

The embodiments disclosed herein are not limited to only cellular scenarios, e.g. eNB-UE, but also the more generic framework for which such measurement classes can apply. As examples, the present disclosure could be applied in the device-to-device context, Machine Type Communication (MTC), or in wired networks when reported measurements are fed back and used.

In some embodiments, the differentiated handling of interactions is dependent on more than two network nodes. Thus, a first network node may obtain information about a category of one or more second network nodes related to an interaction type and further select a communication algorithm (or set of instructions) for use by one or more processors at the first network node, based on the interaction type and on the category of the one or more second nodes. Finally, the first network node may initiate the one or more interactions using the communication algorithm. It should be noted that throughout this disclosure, the term "communication algorithm" is used interchangeably with "set of instructions." Thus, the two terms should be considered equivalent. The first network may be itself one of a plurality of nodes. The differentiated handling (customized configuration) may be on a per node pair basis, pertain to an end-to-end scenario and/or pertain to configuring pairs or clusters of nodes. Examples of differentiated handling of interactions dependent on more than two network nodes may include, without limitation: a) multi-hop communication (for example, the granularity of the information transmitted in a hop may depend on the hop between nodes which represents the "weakest" link, and should therefore not depend only on the category of the two nodes on both sides of a given hop); b) amplify-and-forward relaying, for which the differentiated handling may depend on the category of the two nodes interacting through the relay node; and c) cooperative transmission/reception/relaying.

The node category may include any one or any combination of the following features: specific node identity features, such as: type of node, model of the node, manufacturer of the node and user identity features. Thus, differentiated handling may consider not only specific node identity, but also the category of the user(s) using one or many of the nodes involved in the multi-node interaction (including specific user identity).

In some embodiments, the differentiated handling may extend to more than the "interaction/communication" between the nodes. As an example, one or more first nodes configured as a wireless node, e.g., UE, could, based on the differentiated handling with one or more second nodes, reconfigure itself(themselves) as a relay(s) and start doing additional functions such as D2D network discovery to facilitate communication between the one or more second nodes and some other node(s).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for differentiated handling of at least one interaction of network nodes within a communication network, the method comprising:
    obtaining, at a first network node, information about a category of at least one second network node related to an interaction type, the category of the at least one second network node being at least one of a type of the at least one second network node and a user identity of the at least one second network node and a communication channel having been established between the first network node and the at least one second network node; and
    selecting a communication algorithm based on the obtained information to provide the differentiated handling of the at least one interaction of network nodes within the communication network.

2. The method of claim 1, further comprising implementing the communication algorithm.

3. The method of claim 1, wherein the communication algorithm is a measurement algorithm.

4. The method of claim 1, wherein the information about the category of the at least one second network node is obtained via signaling between the first network node and the at least one second network node.

5. The method of claim 1, further comprising:
    handshaking with the at least one second network node regarding the selection of the communication algorithm.

6. The method of claim 1, wherein the information about the category of at least one second network node is obtained from a container repository located at a third network node.

7. The method of claim 1, wherein the information about the category of the at least one second network node is obtained from a container repository provided in a memory at the first network node.

8. The method of claim 1, further comprising:
    determining a first category for the first network node, the first category for the first network node being at least one of a type of the first network node and a user identity of the first network node;
    determining a second category for the at least one second network node based on the obtained information, the second category for the at least one second network node being at least one of a type of the at least one second network node and a user identity of the at least one second network node;
    creating a pairing entry in the container repository, the pairing entry including a pairing of the first category for the first network node with the second category for the at least one second network node; and
    identifying the communication algorithm based at least on the pairing entry.

9. The method of claim 1, wherein the interaction type is a differentiated link establishment between the first network node and at least one of the at least one second network node.

10. The method of claim 1, wherein the interaction type is providing link quality information.

11. A network entity configured for differentiated handling of at least one interaction of network nodes within a communication network, the network entity comprising:
processing circuitry comprising:
a memory; and
a processor, the memory in communication with the processor, the memory having instructions that, when executed by the processor, configure the processor to:
execute a special handler configured to obtain information about a category of at least one second network node related to an interaction type, the category of the at least one second network node being at least one of a type of the at least one second network node and a user identity of the at least one second network node and a communication channel having been established between a first network node and the at least one second network node; and
select a communication algorithm based on the obtained information to provide the differentiated handling of the at least one interaction of network nodes within the communication network.

12. The network entity of claim 11, wherein the memory further stores instructions that, when executed, configure the processor to implement the communication algorithm.

13. The network entity of claim 11, wherein the communication algorithm is a measurement algorithm.

14. The network entity of claim 11, wherein the information about the category of the at least one second network node is obtained via signaling between the network entity and the at least one second network node.

15. The network entity of claim 11, wherein the memory further stores instructions that, when executed, configure the processor to handshake with the at least one second network node regarding the selection of the communication algorithm.

16. The network entity of claim 11, wherein the information about the category of the at least one second network node is obtained from a container repository located at a third network node.

17. The network entity of claim 11, wherein the information about the category of the at least one second network node is obtained from a container repository provided in the memory.

18. The network entity of claim 11, wherein the memory further stores instructions that, when executed, configure the processor to:
determine a first category for the first network node, the first category for the first network node being at least one of a type of the first network node and a user identity of the first network node;
determine a second category for the at least one second network node based on the obtained information, the second category for the at least one second network node being at least one of a type of the at least one second network node and a user identity of the at least one second network node;
create a pairing entry in the container repository, the pairing entry including a pairing of the first category for the first network node with the second category for the at least one second network node; and
identify the communication algorithm based at least on the pairing entry.

19. The network entity of claim 11, wherein the interaction type is a differentiated link establishment between the network entity and at least one of the at least one second network node.

20. The network entity of claim 11, wherein the interaction type is providing link quality information.

\* \* \* \* \*

UNITED STATES PATENT AND TRADEMARK OFFICE
CERTIFICATE OF CORRECTION

| | |
|---|---|
| PATENT NO. | : 11,234,143 B2 |
| APPLICATION NO. | : 16/069074 |
| DATED | : January 25, 2022 |
| INVENTOR(S) | : Lightstone et al. |

It is certified that error appears in the above-identified patent and that said Letters Patent is hereby corrected as shown below:

In the Specification

In Column 5, Line 67, delete "machine type (MTC)" and insert -- machine type communication (MTC) --, therefor.

In Column 6, Line 2, delete "equipped" and insert -- equipment --, therefor.

In Column 10, Line 57, delete "mobile station" and insert -- mobile --, therefor.

In Column 10, Line 58, delete "mobile station" and insert -- mobile --, therefor.

In Column 11, Line 30, delete "signal-to-interference-plus-noise" and insert -- signal-to-interference-plus-noise ratio --, therefor.

In Column 12, Line 55, delete "network second" and insert -- second network --, therefor.

Signed and Sealed this
Twelfth Day of July, 2022

Katherine Kelly Vidal
*Director of the United States Patent and Trademark Office*